(12) United States Patent
Baruch et al.

(10) Patent No.: US 11,994,999 B2
(45) Date of Patent: May 28, 2024

(54) STORAGE MANAGEMENT SYSTEM AND METHOD

(71) Applicant: Dell Products L.P., Round Rock, TX (US)

(72) Inventors: Oran Baruch, Tel Aviv-Jaffa (IL); Vladimir Shveidel, Pardes Hana (IL); Alexander Shknevsky, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/869,892

(22) Filed: Jul. 21, 2022

(65) Prior Publication Data

US 2024/0028520 A1 Jan. 25, 2024

(51) Int. Cl.
*G06F 12/08* (2016.01)
*G06F 12/0891* (2016.01)

(52) U.S. Cl.
CPC .. *G06F 12/0891* (2013.01); *G06F 2212/1024* (2013.01)

(58) Field of Classification Search
CPC ............... G06F 12/0891; G06F 2212/1024
See application file for complete search history.

(56) References Cited

U.S. PATENT DOCUMENTS 10,936,500 B1 * 3/2021 Inna .................... G06F 12/0891

FOREIGN PATENT DOCUMENTS

| CA | 2761553 A1 * | 6/2013 | ......... G06F 12/0888 |
| CN | 112163045 A * | 1/2021 | |

\* cited by examiner

*Primary Examiner* — Masud K Khan
(74) *Attorney, Agent, or Firm* — Brian J. Colandreo; Heath M. Sargeant; Holland & Knight LLP

(57) ABSTRACT

A method, computer program product, and computing system for generating a page buffer pool within a data journal of a storage node. A plurality of IO operations may be processed on a storage array using the storage node. A plurality of pages may be persisted in a plurality of page buffers within the page buffer pool based upon, at least in part, the processing of the plurality of IO operations. For each page buffer in the page buffer pool, a hash of the page buffer may be generated, thus defining a page buffer hash. The page buffer hash may be stored in a page descriptor associated with the page buffer.

17 Claims, 4 Drawing Sheets

STORAGE MANAGEMENT SYSTEM AND METHOD

BACKGROUND

Storing and safeguarding electronic content may be beneficial in modern business and elsewhere. Accordingly, various methodologies may be employed to protect and distribute such electronic content.

For example, one of the most significant challenges with conventional ring-based log architectures is the issue of large stepwise resource freeing. Consider, for example, a storage system with a page buffer ring with a capacity of e.g., several gigabytes. In normal operation, when the ring reaches some predefined capacity threshold, a log flush is initiated. A flush orchestrator sorts the full flush working set (i.e., a set of outstanding page descriptor-page buffer pairs) according to some application locality policy and builds several separate working sets for parallel flushers. Ideally, the page descriptor-page buffer pairs that are preferable to be flushed together (e.g., with a logical address related to same metadata page) will be added to the same working set and flushed by the same flusher.

However, the ring tail may be moved (and space reclaimed) just when the flusher that owns the page buffer related to the tail, completes its work. In other words, even if all flushers (except the one owning the tail) completes their work, the space cannot be reclaimed. Such dependency makes space reclaiming unsmooth and unpredictable, and finally, causes IO write throttling, IO latency hiccups, etc. As such, conventional page buffer rings force the storage system to be very sensitive to flush latency which creates many secondary performance degradation problems (e.g., low adaptiveness, QoS complexity, etc.).

SUMMARY OF DISCLOSURE

In one example implementation, a computer-implemented method executed on a computing device may include, but is not limited to, generating a page buffer pool within a data journal of a storage node. A plurality of IO operations may be processed on a storage array using the storage node. A plurality of pages may be persisted in a plurality of page buffers within the page buffer pool based upon, at least in part, the processing of the plurality of IO operations. For each page buffer in the page buffer pool, a hash of the page buffer may be generated, thus defining a page buffer hash. The page buffer hash may be stored in a page descriptor associated with the page buffer.

One or more of the following example features may be included. Generating the page buffer pool within the data journal may include initializing the page buffer pool with a plurality of contiguous portions of a predefined block size. A page may be flushed from the page buffer to the storage array. The page may be invalidated from a cache memory system. The page buffer may be freed within the page buffer pool. The page buffer may be marked as flushed. A recovery event associated with the storage system may be detected. Each page descriptor of the plurality of page descriptors may be iterated through to order the plurality of page descriptors from newest to oldest. Any duplicate references in the plurality of page descriptors for a particular page buffer may be identified. In response to identifying duplicate references for the particular page buffer, all but the newest page descriptor may be invalidated from the ordered listing of page descriptors for the particular page buffer with duplicate references. An IO read operation for a page associated with the particular page buffer may be received. A hash of the particular page buffer may be generated. The hash of the particular page buffer may be compared to the page buffer hash of the newest page descriptor. In response to determining that the hash of the particular page buffer is equal to the page buffer hash of the newest page descriptor, the page associated with the page buffer may be provided as a response to the IO read operation. In response to determining that the hash of the particular page buffer is not equal to the page buffer hash of the newest page descriptor, the page associated with the page buffer may be read from the storage array. A hash of the page read from the storage array may be generated. The hash of the page read from the storage array may be compared to the page buffer hash of the newest page descriptor. In response to determining that the hash of the page read from the storage array is equal to the page buffer hash of the newest page descriptor, the page read from the storage array may be provided as a response to the IO read operation.

In another example implementation, a computer program product resides on a computer readable medium that has a plurality of instructions stored on it. When executed by a processor, the instructions cause the processor to perform operations that may include, but are not limited to, generating a page buffer pool within a data journal of a storage node. A plurality of IO operations may be processed on a storage array using the storage node. A plurality of pages may be persisted in a plurality of page buffers within the page buffer pool based upon, at least in part, the processing of the plurality of IO operations. For each page buffer in the page buffer pool, a hash of the page buffer may be generated, thus defining a page buffer hash. The page buffer hash may be stored in a page descriptor associated with the page buffer.

One or more of the following example features may be included. Generating the page buffer pool within the data journal may include initializing the page buffer pool with a plurality of contiguous portions of a predefined block size. A page may be flushed from the page buffer to the storage array. The page may be invalidated from a cache memory system. The page buffer may be freed within the page buffer pool. The page buffer may be marked as flushed. A recovery event associated with the storage system may be detected. Each page descriptor of the plurality of page descriptors may be iterated through to order the plurality of page descriptors from newest to oldest. Any duplicate references in the plurality of page descriptors for a particular page buffer may be identified. In response to identifying duplicate references for the particular page buffer, all but the newest page descriptor may be invalidated from the ordered listing of page descriptors for the particular page buffer with duplicate references. An IO read operation for a page associated with the particular page buffer may be received. A hash of the particular page buffer may be generated. The hash of the particular page buffer may be compared to the page buffer hash of the newest page descriptor. In response to determining that the hash of the particular page buffer is equal to the page buffer hash of the newest page descriptor, the page associated with the page buffer may be provided as a response to the IO read operation. In response to determining that the hash of the particular page buffer is not equal to the page buffer hash of the newest page descriptor, the page associated with the page buffer may be read from the storage array. A hash of the page read from the storage array may be generated. The hash of the page read from the storage array may be compared to the page buffer hash of the newest page descriptor. In response to determining that the hash of the page read from the storage array is equal to the page buffer hash of the newest page descriptor, the page read from the storage array may be provided as a response to the IO read operation.

In another example implementation, a computing system includes at least one processor and at least one memory architecture coupled with the at least one processor, wherein the at least one processor configured to generating a page buffer pool within a data journal of a storage node. The at least one processor may be further configured to process a plurality of IO operations on a storage array using the storage node. The at least one processor may be further configured to persist a plurality of pages in a plurality of page buffers within the page buffer pool based upon, at least in part, the processing of the plurality of IO operations. The at least one processor may be further configured to, for each page buffer in the page buffer pool, generate a hash of the page buffer, thus defining a page buffer hash. The at least one processor may be further configured to store the page buffer hash in a page descriptor associated with the page buffer.

One or more of the following example features may be included. Generating the page buffer pool within the data journal may include initializing the page buffer pool with a plurality of contiguous portions of a predefined block size. A page may be flushed from the page buffer to the storage array. The page may be invalidated from a cache memory system. The page buffer may be freed within the page buffer pool. The page buffer may be marked as flushed. A recovery event associated with the storage system may be detected. Each page descriptor of the plurality of page descriptors may be iterated through to order the plurality of page descriptors from newest to oldest. Any duplicate references in the plurality of page descriptors for a particular page buffer may be identified. In response to identifying duplicate references for the particular page buffer, all but the newest page descriptor may be invalidated from the ordered listing of page descriptors for the particular page buffer with duplicate references. An IO read operation for a page associated with the particular page buffer may be received. A hash of the particular page buffer may be generated. The hash of the particular page buffer may be compared to the page buffer hash of the newest page descriptor. In response to determining that the hash of the particular page buffer is equal to the page buffer hash of the newest page descriptor, the page associated with the page buffer may be provided as a response to the IO read operation. In response to determining that the hash of the particular page buffer is not equal to the page buffer hash of the newest page descriptor, the page associated with the page buffer may be read from the storage array. A hash of the page read from the storage array may be generated. The hash of the page read from the storage array may be compared to the page buffer hash of the newest page descriptor. In response to determining that the hash of the page read from the storage array is equal to the page buffer hash of the newest page descriptor, the page read from the storage array may be provided as a response to the IO read operation.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
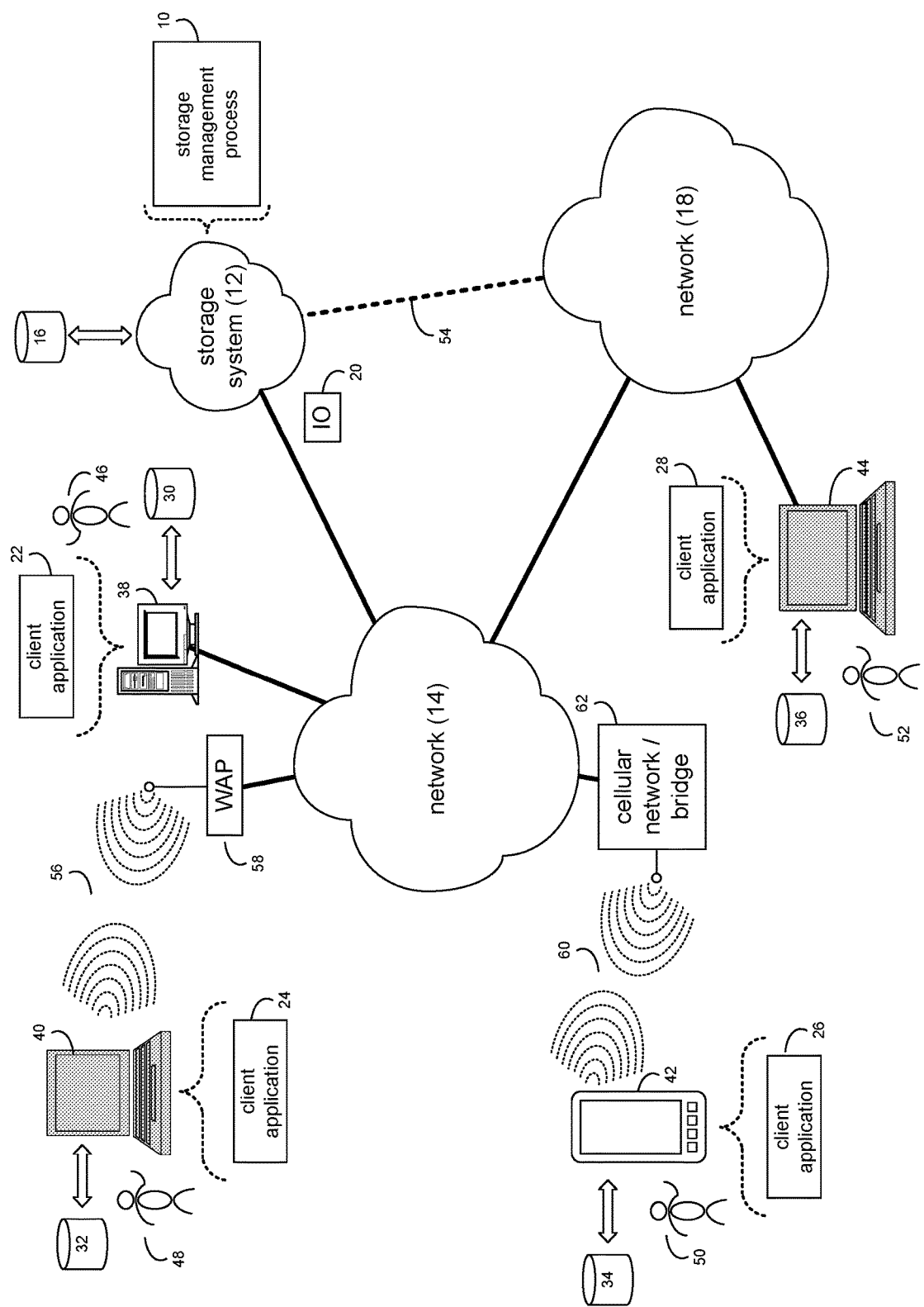
FIG. 1 is an example diagrammatic view of a storage system and a storage management process coupled to a distributed computing network according to one or more example implementations of the disclosure.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage management process, such as storage management process 10 of FIG. 1, may include but is not limited to, generating a page buffer pool within a data journal of a storage node. A plurality of IO operations may be processed on a storage array using the storage node. A plurality of pages may be persisted in a plurality of page buffers within the page buffer pool based upon, at least in part, the processing of the plurality of IO operations. For each page buffer in the page buffer pool, a hash of the page buffer may be generated, thus defining a page buffer hash. The page buffer hash may be stored in a page descriptor associated with the page buffer.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
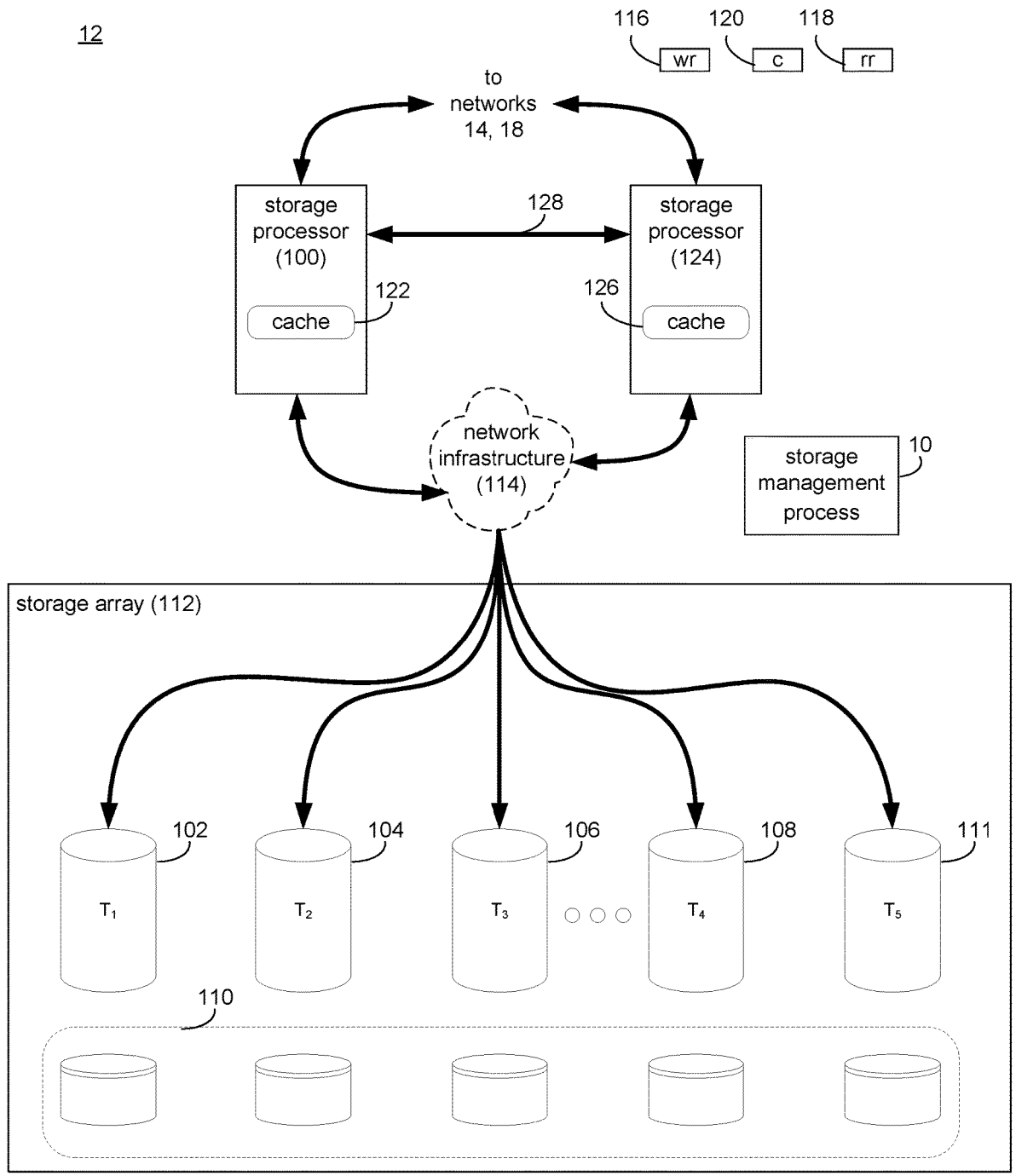
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

Figure 3:
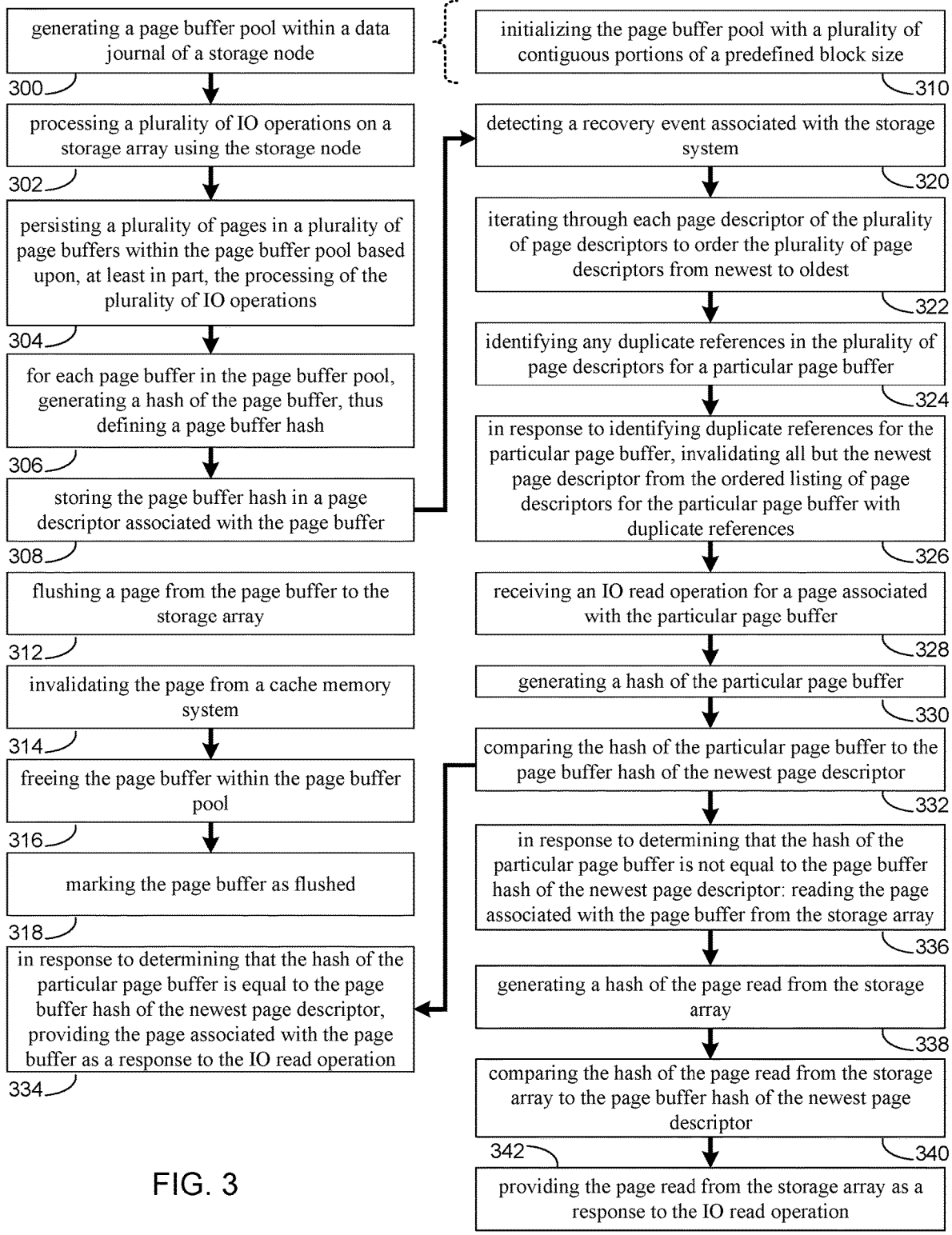
FIG. 3 is an example flowchart of storage management process according to one or more example implementations of the disclosure.
Figure 4:
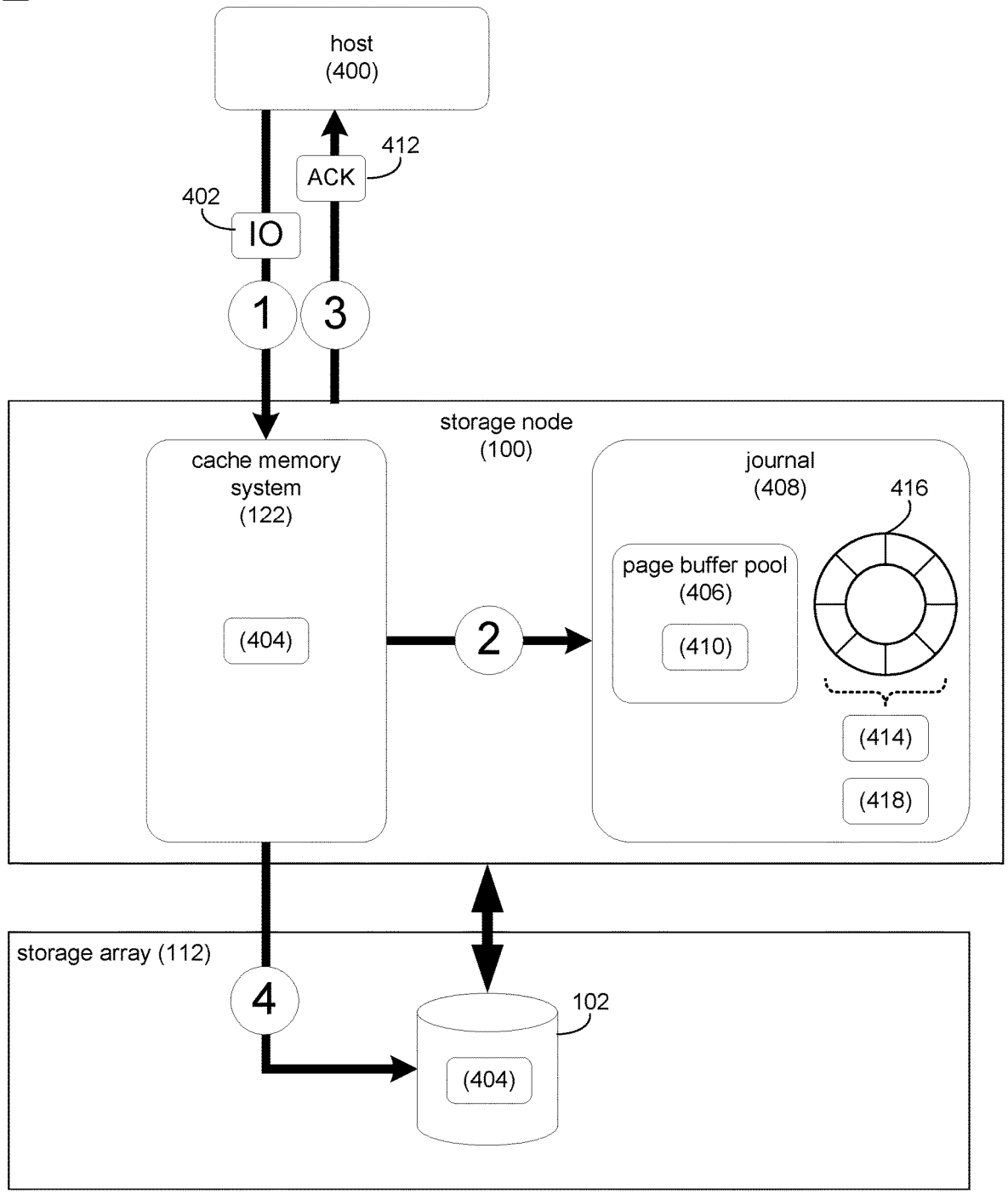
FIG. 4 is an example diagrammatic view of the storage system of FIG. 1 according to one or more example implementations of the disclosure.

The Storage Management Process:

Referring also to the examples of FIGS. 3-4 and in some implementations, storage management process 10 may generate 300 a page buffer pool within a data journal of a storage node. A plurality of IO operations may be processed 302 using the storage node. A plurality of pages may be persisted 304 in a plurality of page buffers within the page buffer pool based upon, at least in part, the processing of the plurality of IO operations. For each page buffer in the page buffer pool, a hash of the page buffer may be generated 306, thus defining a page buffer hash. The page buffer hash may be stored 308 in a page descriptor associated with the page buffer.

As will be discussed in greater detail below, implementations of the present disclosure may allow for improved data journal or log space reclamation during the processing of data on a data journal. For example, one of the most significant challenges with conventional ring-based log architectures is the issue of large stepwise resource freeing. Consider, for example, a storage system with a page buffer ring with a capacity of e.g., several gigabytes. In normal operation, when the ring reaches some predefined capacity threshold, a log flush is initiated. A flush orchestrator sorts the full flush working set (i.e., a set of outstanding page descriptor-page buffer pairs) according to some application locality policy and builds several separate working sets for parallel flushers. Ideally, the page descriptor-page buffer pairs that are preferable to be flushed together (e.g., with a logical address related to same metadata page) will be added to the same working set and flushed by the same flusher.

However, the ring tail may be moved (and space reclaimed) just when the flusher that owns the page buffer related to the tail, completes its work. In other words, even if all flushers (except the one owning the tail) complete their work, the space cannot be reclaimed. Such dependency makes space reclaiming unsmooth and unpredictable, and finally, causes IO write throttling, IO latency hiccups, etc. As such, conventional page buffer rings force the storage system to be very sensitive to flush latency, which creates many secondary performance degradation problems (e.g., low adaptiveness, QoS complexity, etc.).

Implementations of the present disclosure may allow for smoother space reclaiming by converting the conventional page buffer ring to page buffer pool. In this manner and as will be discussed in greater detail below, there are no dependencies on the tail in the described page buffer pool such that each page buffer may be released/reclaimed immediately after being destaged. Accordingly, the performance of the storage system may be enhanced by avoiding the unsmooth and unpredictable reclaiming of space in a data journal/log.

In some implementations, storage management process 10 may generate 300 a page buffer pool within a data journal of a storage node. A data journal may generally include one or more non-volatile random access memory (NVRAM) devices configured to provide a log of the data written to storage array. For example, the contents of the journal may be preserved in the event of a power failure or other failure of the cache memory system. In some implementations and in response to the failure of the cache memory system, storage management process 10 may recover data from the data journal. The data journal may include two data structures, a page buffer pool and a page descriptor ring. As discussed above, conventional storage systems include a ring for managing page buffers within the storage nodes. However, because of the risk of space reclaiming issues, storage management process 10 may provide performance enhancements by utilizing a page buffer pool.

A page buffer pool may generally include a collection of memory within the journal for persisting portions of data. For example, data may be stored in the storage system in predefined portion sizes or "pages". In one example, each page is four kilobytes (4 KB). In another example, each page is eight kilobytes (8 KB). However, it will be appreciated that the page size may be specifically defined (e.g., user-defined or automatically defined) for each storage system or application within the scope of the present disclosure.

In some implementations, generating 300 the page buffer pool within the data journal may include initializing 310 the page buffer pool with a plurality of contiguous portions of a predefined block size. For example, storage management process 10 may initialize a pool-based structure for page buffers, which represent pages on persistent media (e.g., 4 KB or 8 KB) for low latency, write cache. The pool may be initialized 310 with contiguous pages in a predefined block size. The predefined block size may be larger than the storage page size (e.g., 4 KB or 8 KB), as the block size which is in use by the storage system client may be, for example, 256 KB, 1 MB, or any other value. When pages are allocated, storage management process 10 may attempt to obtain a contiguous page buffer in the persistent media space of the data journal for better performance, writing into the media, and for minimizing the amount of IO requests or operations sent to the persistent media.

In some implementations, storage management process 10 may process 302 a plurality of IO operations using the storage node. For example and referring also to FIG. 4, suppose a host (e.g., host 400) sends an IO request (e.g., IO request 402) to write data to a storage array (e.g., storage array 112) using a storage node (e.g., storage node 100). In this example, storage management process 10 may write the data (e.g., page 404) to the cache memory system (e.g., cache memory system 122) of the processing storage node (e.g., storage node 100). This is shown as action "1" in FIG. 4. As will be discussed in greater detail below, it will be appreciated that a read IO operation may be processed on the storage node (e.g., storage node 100).

In some implementations, storage management process 10 may persist 304 a plurality of pages in a plurality of page buffers within the page buffer pool based upon, at least in part, the processing of the plurality of IO operations. For example and in response to the failure of the cache memory system, storage management process 10 may recover data from the data journal. Storage management process 10 may write the data (e.g., page 404) to a page buffer pool (e.g., page buffer pool 406) of a data journal (e.g., journal 408). The process of persisting 304 page 404 is shown as "2" in FIG. 4. As shown in FIG. 4, persistent page 404 may be represented as page buffer 410.

In some implementations, storage management process 10 may, for each page buffer in the page buffer pool, generate 306 a hash of the page buffer, thus defining a page buffer hash. As is known in the art, a hash function is any function that can be used to map data of arbitrary size to a fixed-size value. For example, storage management process 10 may utilize a hash function to generate 306 a "page buffer hash" or hash representation of the data of each page buffer. This page buffer hash may be a unique, fixed-size representation of the data of a particular page buffer. In this manner and as will be discussed in greater detail below, the page buffer hash may allow the data of a page buffer to be identified and compared to the data in the cache memory system and/or the storage array within limited computational resources. For example, by representing each page buffer as a hash value, the computational resources required for a comparison of the data of a page buffer in the data journal with other candidate page buffers may be reduced. Additionally, the time required to compare the hash representation of the data of a page buffer in the data journal and other candidate page buffers may be reduced relative to comparisons of the entirety of the page buffers. Storage management process 10 may utilize any hash function to generate 306 the page buffer hash within the scope of the present disclosure. In some implementations, storage management process 10 may "salt" the hash with other information (e.g., the logical address) to get a different hash for similar data residing on different addresses. In this manner, storage management process 10 may generate 306 a page buffer hash for each page buffer in various ways within the scope of the present disclosure.

In some implementations, storage management process 10 may store 308 the page buffer hash in a page descriptor associated with the page buffer. A page descriptor may generally include a reference or pointer to a page buffer that includes a logical address of the data the corresponding page buffer contains. The page descriptor may also include a sequence transaction number that tracks the order of write operations. Additionally, the page descriptor may include other types of information. In some implementations, storage management process 10 may store 308 each page descriptor in a data structure. For example, storage management process 10 may store 308 each page descriptor in a page descriptor ring. As is known in the art, a ring buffer may allow data to be added to the "head" of the ring buffer and released or overwritten from the tail of the ring buffer. In this manner, the ring buffer may appear to be circular in that older data is overwritten with newer data. In some implementations, the page descriptor may be utilized to recover data during a restart or storage system failure. For example, page descriptors may be used to determine the order of page buffers to apply to recover a storage system.

In some implementations, data may be considered to be persisted when a page descriptor is generated. For example, once a page descriptor is stored in the data journal, the content and order of a page buffer may be recovered during a storage system failure or restart. Referring again to FIG. 4, storage management process 10 may send an acknowledgment signal (e.g., ACK 412) to the host device (e.g., host device 400) once the data (e.g., page 404) is persisted in non-volatile memory (e.g., data journal 408). Specifically, once the page descriptor (e.g., page descriptor 414) is stored 308 in the page descriptor ring (e.g., page descriptor ring 416). This is shown as "3" in FIG. 4.

In some implementations, storage management process 10 may flush 312 a page from the page buffer; invalidate 314 the page from a cache memory system; free 316 the page buffer within the page buffer pool; and mark 318 the page buffer as flushed. For example, at some point in time after writing the data to the cache memory system and data journal, data may be "flushed" 312 or written from the cache memory system to the persistent memory of the storage array. Flushing a page buffer may include flushing a page descriptor-page buffer pair. For example and as will be discussed in greater detail below, when the page descriptor-page buffer pair is flushed, the data of the page buffer may be written (from the cache memory system) to the persistent memory of the storage system while the page descriptor may be retained. As will be discussed in greater detail below, storage management process 10 may wait for a recover event to "lazily" remove the corresponding page descriptor. In this manner, storage management process 10 may provide efficient data journal management without explicit page descriptor invalidation. When flushing a page, storage management process 10 may invalidate 314 the page from the cache memory system. As is known in the art, invalidating an entry from the cache memory system includes replacing or removing entries of the cache memory system.

Referring again to FIG. 4 and at some point in time after writing the data (e.g., page 404) to cache memory system 122 and data journal 408, page 404 may be "flushed" or written from cache memory system 122 to the persistent memory of the storage array (e.g., storage array 112). Page 404 may be invalidated in cache memory system 122 during the flushing 312. This is shown as "4" in FIG. 4. In response to invalidating 314 the page from the cache memory system, storage management process 10 may free 316 the page buffer (e.g., page buffer 410) back to the page buffer pool (e.g., page buffer pool 406). For example, freeing 316 the page buffer may include releasing the page buffer for writing and storing new data associated with a new IO write operation. In some implementations and in response to freeing 316 the page buffer, storage management process 10 may mark 318 the page buffer (e.g., page buffer 410) as flushed. In this manner, the page may be marked as flushed for a read IO operation.

In some implementations, storage management process 10 may detect 320 a recovery event associated with the storage system; iterate 322 through each page descriptor of the plurality of page descriptors to order the plurality of page descriptors from newest to oldest; identify 324 any duplicate references in the plurality of page descriptors for a particular page buffer; and in response to identifying duplicate references for the particular page buffer, invalidate 326 all but the newest page descriptor from the ordered listing of page descriptors for the particular page buffer with duplicate references. For example, suppose the storage system experiences a failure or restarts. In this example, a recovery event may be initiated on the storage system in response to determining the storage system failure or restart. Storage management process 10 may detect 320 a recovery event associated with the storage system. For example, the storage system may automatically detect a recovery event in response to a storage system failure.

In some implementations and during recovery, storage management process 10 may iterate 322 through each page descriptor of the plurality of page descriptors. For example, storage management process 10 may order each page descriptor from newest to oldest. However, it will be appreciated that storage management process 10 may, in another implementation, iterate 322 through each page descriptor to order each page descriptor from oldest to newest. As discussed above, when flushing 312 a page buffer from the cache memory system, storage management process 10 may free 316 the page buffer but may retain page descriptor. For example, storage management process 10 may avoid using additional NVRAM write operations that are computationally expensive and that may reduce overall storage system performance. Rather, storage management process 10 may identify 324 any duplicate references in the plurality of page descriptors for a particular page buffer. For example, storage management process 10 may identify 324 a plurality of page descriptors that reference the same page buffer. Storage management process 10 may invalidate 326 all but the newest page descriptor by invalidating 326 each page descriptor associated with a particular page buffer except for the newest page descriptor. As will be discussed in greater detail below, storage management process 10 may perform verification of the page buffer hash stored in the newest page descriptor "lazily" on read or before flush. Storage management process 10 may keep the highest sequence of recovered data for use during the processing of a read IO operation.

Referring again to FIG. 4, suppose that storage management process 10 includes a plurality of page descriptors associated with page buffer 410 (e.g., page descriptors 414, 418). In this example, storage management process 10 may iterate 322 through each page descriptor (e.g., page descriptors 414, 418). Storage management process 10 may determine that page descriptor 414 is the newest page descriptor. Accordingly, storage management process 10 may invalidate 326 all but page descriptor 414.

In some implementations, storage management process 10 may receive 328 an IO read operation for a page associated with the particular page buffer; generate 330 a hash of the particular page buffer; and compare 332 the hash of the particular page buffer to the page buffer hash of the newest page descriptor. For example, suppose that storage management process 10 receives 328 an IO read operation for a page associated with the particular page buffer (e.g., page 404 associated with page buffer 410). In this case, storage management process 10 may generate 330 a hash on the particular page buffer (e.g., page buffer 410). Storage management process 10 may compare 332 the hash of the particular page buffer (e.g., the hash of page buffer 410) to the hash of the page buffer of the newest page descriptor (e.g., the hash of page buffer 410 stored in page descriptor 414). Comparing 332 the hash of the particular page buffer and the hash of the page buffer of the newest page descriptor may include determining whether the hash values are equal and/or have at least a threshold level of similarity. The threshold level of similarity may be user-defined and/or a default value.

In some implementations, storage management process 10 may, in response to determining that the hash of the particular page buffer is equal to the page buffer hash of the newest page descriptor, provide 334 the page associated with the page buffer as a response to the IO read operation. Continuing with the above example, suppose that when comparing 332 the hash of page buffer 410 to the hash of page buffer 410 stored in page descriptor 414, storage management process 10 determines that the hash of page buffer 410 and the hash of page buffer 410 stored in page descriptor 414 are equal. In this example, the determination of an "equal value" may include determining that the hash values are sufficiently similar based upon, at least in part, a threshold as described above. Accordingly, storage management process 10 may provide 334 the page (e.g., page 404) associated with the page buffer (e.g., page buffer 410) as a response to the IO read operation.

In some implementations, storage management process 10 may, in response to determining that the hash of the particular page buffer is not equal to the page buffer hash of the newest page descriptor: read 336 the page associated with the page buffer from the storage array; generate 338 a hash of the page read from the storage array; compare 340 the hash of the page read from the storage array to the page buffer hash of the newest page descriptor; and, in response to determining that the hash of the page read from the storage array is equal to the page buffer hash of the newest page descriptor, provide 342 the page read from the storage array as a response to the IO read operation. For example, if the comparison indicates an inconsistent hash (i.e., not equal or not sufficient similar based on a threshold), storage management process 10 may read 336 the page associated with the page buffer from the storage array (e.g., the persistent memory of the storage system). Storage management process 10 may verify the page hash against the hash, which is stored in the page descriptor of the page buffer by generating 338 a hash of the page read from the storage array and comparing 340 the hash of the page read from the storage array to the page buffer hash of the newest page descriptor.

Referring again to FIG. 4, suppose that when comparing 332 the hash of page buffer 410 to the hash of page buffer 410 stored in page descriptor 414, storage management process 10 determines that the hash of page buffer 410 and the hash of page buffer 410 stored in page descriptor 414 are not equal. Accordingly, storage management process 10 may read 336 the page (e.g., page 404) from the storage array (e.g., storage array 112) and generate 338 a hash of page 404. Storage management process 10 may compare 340 the hash of page 404 read from storage array 112 and the page buffer hash of page descriptor 414. Suppose that storage management process 10 determines that these hash values (i.e., the hash of page 404 read from storage array 112 and the page buffer hash of page descriptor 414) are equal or sufficiently similar. In response to determining that the hash of the page read from the storage array is equal to the page buffer hash of the newest page descriptor, storage management process 10 may provide 342 page 404 read from storage array 112 as a response to the IO read operation.

In some implementations, storage management process 10 may, in response to determining that the hash of the page buffer read from the storage system is not equal to the page buffer hash of the newest page descriptor, enter an error handling flow. For example, suppose that storage management process 10 determines that the hash of page 404 read from storage array 112 and the page buffer hash of page descriptor 414 are not equal or sufficiently similar. In response to determining that the hash of the page read from the storage array is not equal to the page buffer hash of the newest page descriptor, storage management process 10 may enter an error handling flow. As is known in the art, an error handling flow may include options for resolving data corruption. In this manner and using the error handling flow, storage management process 10 may allow for the recovery or rewriting of the page to the storage system.

In some implementations, storage management process 10 may determine that the IO read operation concerns a page that is flushed before the read IO operation or during the read IO operation. In this example, storage management process 10 may read the page from the storage array as discussed above.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    generating a page buffer pool within a data journal of a storage node;
    processing a plurality of IO operations on a storage array using the storage node;
    persisting a plurality of pages in a plurality of page buffers within the page buffer pool based upon, at least in part, the processing of the plurality of IO operations;
    for each page buffer in the page buffer pool, generating a hash of the page buffer, thus defining a page buffer hash;
    storing the page buffer hash in a page descriptor associated with the page buffer;
    detecting a recovery event associated with the storage system;
    iterating through each page descriptor of the plurality of page descriptors to order the plurality of page descriptors from newest to oldest;
    identifying any duplicate references in the plurality of page descriptors for a particular page buffer; and
    in response to identifying duplicate references for the particular page buffer, invalidating all but the newest page descriptor from the ordered listing of page descriptors for the particular page buffer with duplicate references.

2. The computer-implemented method of claim 1, wherein generating the page buffer pool within the data journal includes initializing the page buffer pool with a plurality of contiguous portions of a predefined block size.

3. The computer-implemented method of claim 1, further comprising:
    flushing a page from the page buffer to the storage array;
    invalidating the page from a cache memory system;
    freeing the page buffer within the page buffer pool; and
    marking the page buffer as flushed.

4. The computer-implemented method of claim 1, further comprising:
    receiving an IO read operation for a page associated with the particular page buffer;
    generating a hash of the particular page buffer; and
    comparing the hash of the particular page buffer to the page buffer hash of the newest page descriptor.

5. The computer-implemented method of claim 4, further comprising:
    in response to determining that the hash of the particular page buffer is equal to the page buffer hash of the newest page descriptor, providing the page associated with the page buffer as a response to the IO read operation.

6. The computer-implemented method of claim 5, further comprising:
    in response to determining that the hash of the particular page buffer is not equal to the page buffer hash of the newest page descriptor:
    reading the page associated with the page buffer from the storage array;
    generating a hash of the page read from the storage array;
    comparing the hash of the page read from the storage array to the page buffer hash of the newest page descriptor; and
    in response to determining that the hash of the page read from the storage array is equal to the page buffer hash of the newest page descriptor, providing the page read from the storage array as a response to the IO read operation.

7. A computer program product residing on a non-transitory computer readable medium having a plurality of instructions stored thereon which, when executed by a processor, cause the processor to perform operations comprising:
    generating a page buffer pool within a data journal of a storage node;
    processing a plurality of IO operations on a storage array using the storage node;
    persisting a plurality of pages in a plurality of page buffers within the page buffer pool based upon, at least in part, the processing of the plurality of IO operations;
    for each page buffer in the page buffer pool, generating a hash of the page buffer, thus defining a page buffer hash;
    storing the page buffer hash in a page descriptor associated with the page buffer;
    detecting a recovery event associated with the storage system;
    iterating through each page descriptor of the plurality of page descriptors to order the plurality of page descriptors from newest to oldest;
    identifying any duplicate references in the plurality of page descriptors for a particular page buffer; and
    in response to identifying duplicate references for the particular page buffer, invalidating all but the newest page descriptor from the ordered listing of page descriptors for the particular page buffer with duplicate references.

8. The computer program product of claim 7, wherein generating the page buffer pool within the data journal includes initializing the page buffer pool with a plurality of contiguous portions of a predefined block size.

9. The computer program product of claim 7, wherein the operations further comprise:
    flushing a page from the page buffer to the storage array;
    invalidating the page from a cache memory system;
    freeing the page buffer within the page buffer pool; and
    marking the page buffer as flushed.

10. The computer program product of claim 7, wherein the operations further comprise:
    receiving an IO read operation for a page associated with the particular page buffer;
    generating a hash of the particular page buffer; and comparing the hash of the particular page buffer to the page buffer hash of the newest page descriptor.

11. The computer program product of claim 10, wherein the operations further comprise:

in response to determining that the hash of the particular page buffer is equal to the page buffer hash of the newest page descriptor, providing the page associated with the page buffer as a response to the IO read operation.

12. The computer program product of claim 11, wherein the operations further comprise:

in response to determining that the hash of the particular page buffer is not equal to the page buffer hash of the newest page descriptor:

reading the page associated with the page buffer from the storage array;

generating a hash of the page read from the storage array;

comparing the hash of the page read from the storage array to the page buffer hash of the newest page descriptor; and in response to determining that the hash of the page read from the storage array is equal to the page buffer hash of the newest page descriptor, providing the page read from the storage array as a response to the IO read operation.

13. A computing system comprising:

a memory; and a processor configured to generate a page buffer pool within a data journal of a storage node, wherein the processor is further configured to process a plurality of IO operations on a storage array using the storage node, wherein the processor is further configured to persist a plurality of pages in a plurality of page buffers within the page buffer pool based upon, at least in part, the processing of the plurality of IO operations, wherein the processor is further configured to, for each page buffer in the page buffer pool, generate a hash of the page buffer, thus defining a page buffer hash, wherein the processor is further configured to store the page buffer hash in a page descriptor associated with the page buffer, wherein the processor is further configured to detect a recovery event associated with the storage system, wherein the processor is further configured to iterate through each page descriptor of the plurality of page descriptors to order the plurality of page descriptors from newest to oldest, wherein the processor is further configured to identify any duplicate references in the plurality of page descriptors for a particular page buffer, and wherein the processor is further configured to, in response to identifying duplicate references for the particular page buffer, invalidate all but the newest page descriptor from the ordered listing of page descriptors for the particular page buffer with duplicate references.

14. The computing system of claim 13, wherein generating the page buffer pool within the data journal includes initializing the page buffer pool with a plurality of contiguous portions of a predefined block size.

15. The computing system of claim 13, wherein the processor is further configured to:

flush a page from the page buffer to the storage array;

invalidate the page from a cache memory system;

free the page buffer within the page buffer pool; and mark the page buffer as flushed.

16. The computing system of claim 13, wherein the processor is further configured to:

receive an IO read operation for a page associated with the particular page buffer;

generate a hash of the particular page buffer; and compare the hash of the particular page buffer to the page buffer hash of the newest page descriptor.

17. The computing system of claim 16, wherein the processor is further configured to:

in response to determining that the hash of the particular page buffer is equal to the page buffer hash of the newest page descriptor, provide the page associated with the page buffer as a response to the IO read operation.

* * * * *